(12) United States Patent
Okuda et al.

(10) Patent No.: US 7,921,816 B2
(45) Date of Patent: Apr. 12, 2011

(54) CONTROL DEVICE FOR HYDRAULICALLY DRIVEN FAN

(75) Inventors: Kozo Okuda, Osaka (JP); Keiji Yanagihara, Osaka (JP); Kouji Hoshi, Osaka (JP)

(73) Assignee: Komatsu Ltd., Tokyo (JP)

( * ) Notice: Subject to any disclaimer, the term of this patent is extended or adjusted under 35 U.S.C. 154(b) by 338 days.

(21) Appl. No.: 12/064,250

(22) PCT Filed: Aug. 28, 2006

(86) PCT No.: PCT/JP2006/316824
§ 371 (c)(1),
(2), (4) Date: Feb. 20, 2008

(87) PCT Pub. No.: WO2007/026627
PCT Pub. Date: Mar. 8, 2007

(65) Prior Publication Data
US 2009/0145376 A1 Jun. 11, 2009

(30) Foreign Application Priority Data
Aug. 29, 2005 (JP) ................................ 2005-248276

(51) Int. Cl.
*F01P 7/02* (2006.01)
(52) U.S. Cl. ................................ 123/41.12; 123/41.49
(58) Field of Classification Search ............... 123/41.11, 123/41.12, 41.49
See application file for complete search history.

(56) References Cited

U.S. PATENT DOCUMENTS

| | | | |
|---|---|---|---|
| 4,823,744 A | 4/1989 | Omura | |
| 6,195,989 B1 * | 3/2001 | Hall et al. | ........................ 60/329 |
| 6,349,882 B1 | 2/2002 | Kita et al. | |
| 6,481,388 B1 * | 11/2002 | Yamamoto | ................. 123/41.12 |
| 2003/0041727 A1 * | 3/2003 | Maruta et al. | .................... 91/443 |

(Continued)

FOREIGN PATENT DOCUMENTS
DE  3812267 A1  11/1988
(Continued)

OTHER PUBLICATIONS

Office Action dated Feb. 9, 2010 in related German Application No. 11 2006 002 204.0 with English translation.

(Continued)

*Primary Examiner* — Noah Kamen
(74) *Attorney, Agent, or Firm* — Fox Rothschild LLP (57) ABSTRACT

A control device for a hydraulically driven fan is provided with a cooling fan which is rotated by a hydraulic motor and carries out ventilation for cooling a working fluid. Further, the control device for the hydraulically driven fan is provided with a sensor for detecting a temperature of the working fluid, and a lever switch for detecting whether a working mechanism actuated by the engine is in a stopped state, by determining whether a working machine lever has been operated. In order that a resonance between the cooling fan and the engine is suppressed, the control device for the hydraulically driven fan further adjusts a rotating speed of the hydraulic motor in correspondence to a detection result by the lever switch. In the case that a stopped state of the working mechanism is detected on the basis of an operation state of the working machine lever by the lever switch, the rotating speed of the hydraulic motor is adjusted. Accordingly, it is possible to adjust and change the rotating speed of the cooling fan, thus it is possible to prevent resonance noise and vibration from being generated between the cooling fan and the engine.

2 Claims, 6 Drawing Sheets

U.S. PATENT DOCUMENTS

2005/0254959 A1   11/2005   Furuta et al.

FOREIGN PATENT DOCUMENTS

| | | |
|---|---|---|
| JP | 04-311620 A2 | 11/1992 |
| JP | 11-107753 A2 | 4/1999 |
| JP | 2000-110560 A2 | 4/2000 |
| JP | 2001-182535 A2 | 7/2001 |
| JP | 2001-193460 A2 | 7/2001 |
| JP | 2005-083344 A2 | 3/2005 |
| JP | 2005-146878 A2 | 6/2005 |
| WO | 2005/024199 | 3/2005 |
| WO | PCT/JP2006/316824 | 10/2006 |

OTHER PUBLICATIONS

German Office Action dated Oct. 1, 2010 for related German patent Application No. 112006002204.0-13.

* cited by examiner

CONTROL DEVICE FOR HYDRAULICALLY DRIVEN FAN

CROSS-REFERENCE TO RELATED APPLICATIONS

This application claims priority to International Application No. PCT/JP2006/316824, filed Aug. 28, 2006, which claims priority to Japanese Application No. 2005-248276, filed Aug. 29, 2005, the entire contents of which are hereby incorporated by reference.

TECHNICAL FIELD

The present invention relates to a control device for a hydraulically driven fan in a construction machine such as a hydraulic excavator or the like.

BACKGROUND OF THE INVENTION

In the construction machine such as the hydraulic excavator, an engine is mounted to a vehicle body, and a working mechanism including a swiveling apparatus, and a boom and the like is actuated on the basis of rotation of the engine via a hydraulic pump or the like. Further, a cooling fan and a hydraulic motor for rotating the cooling fan are mounted to the vehicle body, the hydraulic motor is rotated via the hydraulic pump in accordance with rotation of the engine, and the cooling fan is rotated and blows air. On the basis of the rotation, a working fluid such as a cooling water for cooling the engine and hydraulic oil for actuating the hydraulic motor is cooled.

With respect to the construction machine mentioned above, if the cooling fan is directly coupled to the engine, the cooling fan is rotated at a rotating speed of a fixed relation generated together with the rotating speed of the engine. Accordingly, even in the case that a temperature of the hydraulic oil or the like is low and it does not need to be cooled, the cooling fan is rotated at a high speed as the engine is rotated at a high speed. Therefore, an overcooled state is created, and an engine output is wastefully consumed. Further, there is a problem that an ambient noise is increased in accordance with the rotation of the cooling fan.

In order to cope with the problems mentioned above, construction machines have been widely used that are structured such that the rotating speed of the cooling fan can be independently controlled by rotating the cooling fan by the hydraulic motor. Further, in construction machines disclosed in Patent Document 1 and Patent Document 2, in the case that a temperature of a hydraulic oil or the like is low and it does not need to be cooled, the flow rate of the hydraulic oil is controlled by a valve such that the flow rate of the hydraulic oil discharged from a hydraulic pump for a fan is reduced. Accordingly, the rotating speed of the cooling fan is lowered, the load of an engine is reduced, and it is possible to effectively utilize the output of the engine to drive a main hydraulic pump or the like that actuates a boom or the like. In addition thereto, ambient noise generated by the rotation of the cooling fan is reduced on the basis of the reduction of the rotating speed of the cooling fan.

However, in the conventional structure mentioned above, there has been a problem that a resonance is generated between the cooling fan and the engine at a time when the rotating speed of the cooling fan comes to a specific relation to the rotating speed of the engine due to the reduction of the rotating speed of the cooling fan, whereby great noise and vibration are generated.

Specifically, a relation of an expression (1) in a mathematical expression 1 is established when the engine and the cooling fan rotate. When the difference in frequency between the noise due to the primary frequency of the fan and the noise due to the primary frequency of the engine comes to within a specific value, for example, 10 Hz, the noises resonate and great and uncomfortable resonance noise and vibration are generated. Particularly, in a state in which all of working machine levers 18 are not operated but are arranged at a neutral position, various devices such as a hydraulic pump and the like constituting the working machine are not operated. Accordingly, the noise and the vibration generated together with the resonance noise and the resonance become remarkable, so that an uncomfortable feeling doubles. The value of the frequency difference between the fan primary frequency noise and the engine primary frequency noise, which difference generates resonance, somewhat varies in accordance with a type of motor vehicle and the presence of noise absorbing material.

Expression 1

$$\Delta f = |Ne \times (C/2)/60 - Nf \times F/60| \qquad (1)$$

$\Delta f$: frequency difference between engine and fan (Hz)
Ne: engine rotating speed (rpm)
C: number of engine cylinders
Nf: fan rotating speed (command value) (rpm)
F: number of fan impeller blades
Patent Document 1: Japanese Laid-Open Patent Publication No. 2000-110560
Patent Document 2: Japanese Laid-Open Patent Publication No. 2005-83344

SUMMARY OF THE INVENTION

An objective of the present invention is to inhibit resonance noise and vibration from being generated between a cooling fan and an engine, without adversely affecting a cooling effect or the like of a working fluid.

In accordance with a first aspect of the present invention, a control device for a hydraulically driven fan is provided. The control device includes: a cooling fan rotated by a hydraulic motor and carrying out a ventilation for cooling a working fluid that is involved in an operation of an engine; first detecting means for detecting a temperature of the working fluid; adjusting means for adjusting a rotating speed of the hydraulic motor in correspondence to a result of detection of the first detecting means; second detecting means for detecting whether a working mechanism actuated by the engine is in a stopped state by determining whether a working machine lever has been operated; and control means for controlling an operation of the adjusting means in correspondence to a result of detection by the second detecting means thereby adjusting the rotating speed of the hydraulic motor in such a manner that a resonance between the cooling fan and the engine is suppressed.

In the control device for the hydraulically driven fan in accordance with the first aspect, in the case that the stopped state of the working mechanism is detected by the second detecting means on the basis of the operating state of the working machine lever, the operation of the adjusting means is controlled by the control means, and the rotating speed of the hydraulic motor is adjusted. Accordingly, it is possible to adjust and change the rotating speed of the cooling fan without affecting a cooling effect or the like of the working fluid, and it is possible to inhibit the resonance from being generated between the cooling fan and the engine.

In accordance with a second aspect, the working fluid is a hydraulic oil for actuating the hydraulic motor, and the first detecting means detects a temperature of the hydraulic oil.

In accordance with a third aspect, the working fluid is a cooling water for cooling the engine, and the first detecting means detects a temperature of the cooling water.

In accordance with a fourth aspect, the working fluid is a hydraulic oil for actuating the hydraulic motor and a cooling water for cooling the engine, and the first detecting means detects temperatures of the hydraulic oil and the cooling water.

In accordance with a fifth aspect, the control means causes the adjusting means to operate in such a manner that a rotating speed of the cooling fan is lowered if the working machine lever has not been operated. Since the working machine is in a stopped state in the case that the working machine lever is not operated, the reduction of the rotating speed of the cooling fan is allowed, and the fuel consumption is effectively improved.

In accordance with a sixth aspect, the control means causes the adjusting means to operate in such a manner that a rotating speed of the cooling fan is lowered in the case that a temperature of the working fluid is lower than a predetermined value. Since the working machine is in a stopped state in the case that the temperature of the working fluid is low, the reduction of the rotating speed of the cooling fan is allowed, and the fuel consumption is effectively improved.

In accordance with a seventh aspect, the control means causes the adjusting means to operate in such a manner that a rotating speed of the cooling fan is lowered in the case that the working machine lever has not been operated and a temperature of the working fluid is lower than a predetermined value.

In accordance with an eighth aspect, the control means causes the adjusting means to operate in such a manner that a rotating speed of the cooling fan is increased in the case that the working machine lever has not been operated. Since the working machine is in an operating state while the cooling fan is being operated, there is no problem with increasing the rotating speed of the cooling fan.

In accordance with a ninth aspect, the control means causes the adjusting means to operate in such a manner that a rotating speed of the cooling fan is increased in the case that a temperature of the working fluid is higher than a predetermined value.

In accordance with a tenth aspect, the control means causes the adjusting means to operate in such a manner that a rotating speed of the cooling fan is lowered in the case that the working machine lever has not been operated and a temperature of the working fluid is lower than a predetermined value. Also, the control means causes the adjusting means to operate in such a manner that the rotating speed of the cooling fan is increased in the case that the working machine lever has been operated and the temperature of the working fluid is higher than the predetermined value.

In accordance with an eleventh aspect, the control means is provided with a memory section, and extracts data in a map stored in the memory section so as to control an operation of the adjusting means in accordance with the extracted data. As mentioned above, the control of the operation of the adjusting means in accordance with the data of the map makes it possible to quickly carry out the control for a short time.

In accordance with a twelfth aspect, the control means is provided with a memory section and controls an operation of the adjusting means in accordance with mathematical expressions stored in the memory. As mentioned above, the control of the operation of the adjusting means in accordance with a mathematical expression stored in the memory section. If the operation of the adjusting means is controlled in accordance with the mathematical expression, the volume of data to be stored for the control is reduced, and a load of the memory section is lightened.

In accordance with a thirteenth aspect, when all the working machine levers are switched to a neutral position from an operating position, the control means controls the operations of the engine and the hydraulic motor in such a manner that the rotating speeds of the engine and the cooling fan are lowered from a normal range to a predetermined low rotating speed range, after a predetermined delay time has elapsed. In accordance with this structure, it is possible to save the fuel on the basis of the reduction of the rotating speed of the engine at a time when all the working machine levers are arranged at the neutral position, while preventing the engine rotating speed from being caused to disadvantageously drop by passing the working machine lever through the neutral position.

In accordance with a fourteenth aspect, when at least one working machine lever is switched to an operating position from a state in which all the working machine levers are at neutral position, the control means controls the operations of the engine and the hydraulic motor in such a manner that the rotating speed of the engine is immediately increased from a low rotating speed range to a normal range, and the rotating speed of the cooling fan is gradually increased in a predetermined time. In accordance with this structure, since the rotating speed of the engine is immediately increased from the low rotating speed range to the normal range and the rotating speed of the cooling fan is gradually increased in the predetermined time when at least one working machine lever is switched to the operating position from the state in which all the working machine levers are at the neutral position, it is possible to prevent a pressure of the hydraulic oil from suddenly rising. Thus it is possible to prevent a distributing path of the hydraulic oil and various hydraulic devices from being broken.

DETAILED DESCRIPTION OF THE PREFERRED EMBODIMENTS

A description will be given below of a hydraulic excavator according to a first embodiment of the present invention with reference to FIGS. 1 to 4.

Figure 1:
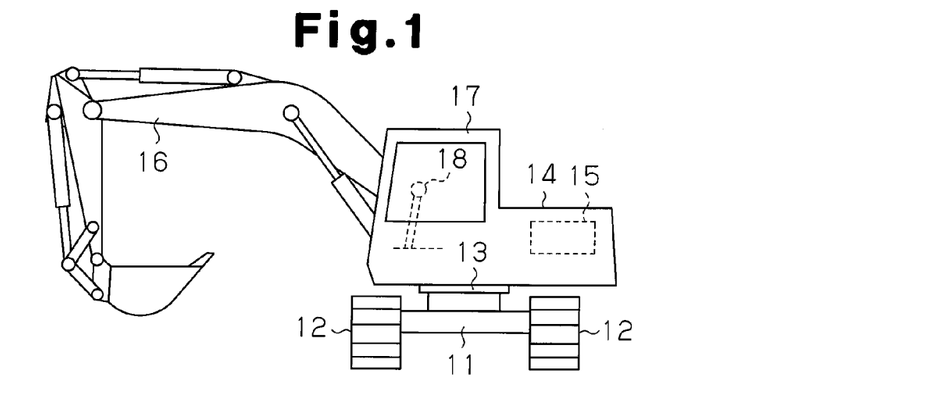
FIG. 1 is a front elevational view showing a hydraulic excavator in accordance with a first embodiment.

As shown in FIG. 1, in the hydraulic excavator, crawler tracks 12 are provided in both sides of a lower traveling body 11, and the lower traveling body 11 moves on the basis of a rotation of the crawler tracks 12. An upper revolving body 14 is attached to an upper portion of the lower traveling body 11 via a revolving apparatus 13 so as to freely revolve. An engine 15 and an associated mechanism thereof are mounted on the upper revolving body 14, and a boom 16 for working is provided in a protruding manner in a side portion thereof. A driver's cabin 17 is provided on the upper revolving body 14, and a plurality of working machine levers 18 including a travel control lever are provided within the driver's cabin 17. Further, various working mechanisms including the crawler tracks 12, the revolving apparatus 13 and the boom 16 are actuated via a hydraulic mechanism such as a hydraulic pump or the like mentioned below, on the basis of a drive of the engine 15, in accordance with the operation of the working machine levers 18.

Figure 2:
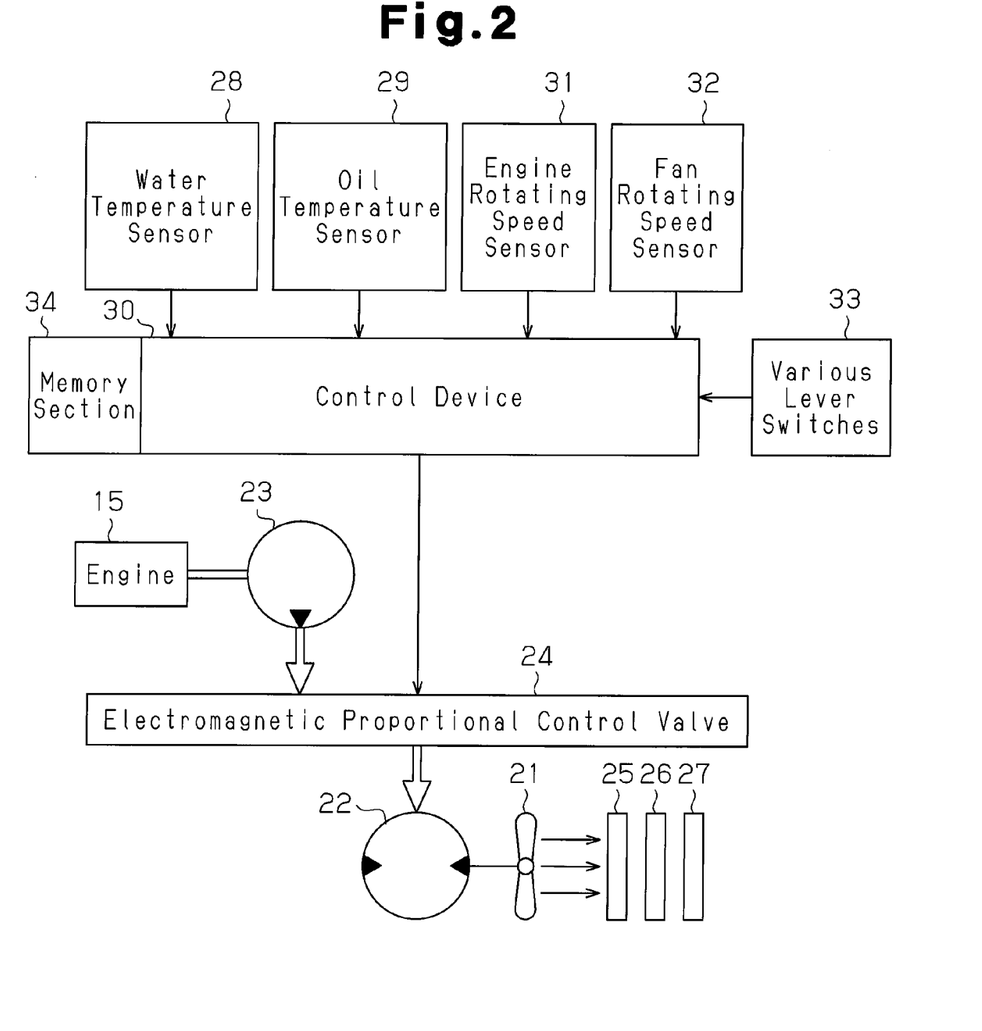
FIG. 2 is a block diagram showing an electric circuit structure of the hydraulic excavator in FIG. 1.

On the upper revolving body 14 of the hydraulic excavator, there are mounted a cooling fan 21 shown in FIG. 2 and a fan hydraulic motor 22 for rotating the cooling fan 21. Also, as shown in FIG. 2, a fan hydraulic pump 23 is coupled to the engine 15. The fan hydraulic pump 23 is rotationally actuated on the basis of the rotation of the engine 15. Further, a hydraulic oil serving as a working fluid is supplied to the hydraulic motor 22 via an electromagnetic proportional control valve 24 serving as adjusting means from the hydraulic pump 23, on the basis of the operation of the hydraulic pump 23, and the hydraulic motor 22 is rotated. In the first embodiment, the number of impeller blades of the cooling fan 21 is six, and the engine 15 is an in-line six-cylinder engine.

An intake air cooler 25, an oil cooler 26 and a radiator 27 are arranged opposed to the cooling fan 21. The intake air cooler 25 is provided for cooling an air serving as a working fluid drawn into the engine 15, the oil cooler 26 is provided for cooling the hydraulic oil circulating through the hydraulic pump 23 and the hydraulic motor 22, and the radiator 27 is provided for cooling a cooling water of the engine 15 serving as the working fluid. Further, air for cooling is sent to the intake air cooler 25, the oil cooler 26 and the radiator 27, on the basis of the rotation of the cooling fan 21 generated by the hydraulic motor 22.

A water temperature sensor 28 and a hydraulic oil temperature sensor 29 serving as first detecting means are provided within respective paths of the cooling water and the hydraulic oil. The temperatures of the cooling water and the hydraulic oil are detected by the sensors 28 and 29 when the engine 15 is being rotated, and the results of detection are output to a control device 30 serving as control means. The control device 30 has a central processing unit (CPU, not shown), a memory section 34 and the like. An engine rotating speed sensor 31 and a fan rotating speed sensor 32 are additionally provided in the engine 15 and the cooling fan 21, respectively. Further, the rotating speeds of the engine 15 and the cooling fan 21 are detected by the sensors 31 and 32 when the engine 15 and the cooling fan 21 are being rotated, and the results of detection are output to the control device 30.

A lever switch 33 serving as second detecting means is arranged near each of the working machine levers 18. Further, when the engine 15 is being rotated, the various lever switches 33 determine whether the working machine levers 18 have been operated. On the basis of this determination, it is detected whether the working mechanism including the boom 16 and the like are in a stopped state, and the result of detection is output to the control device 30.

In the memory section 34 within the control device 30, a program for controlling the entire operation of the hydraulic excavator as well as various data necessary for executing the program are set and stored, and working data generated in accordance with execution of the work is temporarily stored. Examples of the various data stored are maps shown in Tables 1 to 3. Table 1 represents a map that defines frequencies of the engine primary frequency noise per predetermined rotating speed (for example, per 100 rpm) between 850 rpm corresponding to the minimum rotating speed of the engine 15 and 2000 rpm corresponding to the maximum rotating speed in a normal range. Further, Table 2 represents a map that defines frequencies of a fan primary frequency noise per predetermined rotating speed (for example, per 100 rpm) between 500 rpm corresponding to the minimum rotating speed in a normal rotating range of the cooling fan 21 and 1100 rpm corresponding to the maximum rotating speed. Further, Table 3 represents a map that defines a normal rotating speed, a low rotating speed, and a high rotating speed for rotationally controlling the cooling fan 21 at a normal speed, a low speed or a high speed. In other words, as the normal rotating speed of the cooling fan 21 in the map in Table 3, a plurality of values are set per engine rotating speed, and the control device 30 selects an optimum data in the set fan rotating speed data in correspondence to various factors such as an engine load, a temperature of the hydraulic oil and the like, controls the operation of the electromagnetic proportional control valve 24 in such a manner that the selected fan rotating speed is achieved, and controls the rotating speed of the hydraulic motor 22.

TABLE 1

| | Engine rotating speed (rpm) | | | | | | | |
|---|---|---|---|---|---|---|---|---|
| | 850 | ... | ... | ... | 1400 | ... | ... | ... | 2000 |
| Engine primary frequency (Hz) | 42.5 | ... | ... | ... | 70 | ... | ... | ... | 100 |

TABLE 2

| | Fan rotating speed (rpm) | | |
|---|---|---|---|
| | 500 | ... | 800 | ... | 1100 |
| Fan primary frequency (Hz) | 50 | ... | 80 | ... | 110 |

TABLE 3

| | Engine rotating speed (rpm) | | | | | | | |
|---|---|---|---|---|---|---|---|---|
| | 850 | ... | ... | ... | 1400 | ... | ... | ... | 2000 |
| Fan normal rotating speed (rpm) | 500 | ... | ... | ... | 500 | ... | ... | ... | 500 |
| | 550 | ... | ... | ... | 550 | ... | ... | ... | 550 |
| | 550 | ... | ... | ... | 600 | ... | ... | ... | 600 |
| | 550 | ... | ... | ... | 650 | ... | ... | ... | 650 |
| | 550 | ... | ... | ... | 700 | ... | ... | ... | 700 |
| | 550 | ... | ... | ... | 900 | ... | ... | ... | 950 |
| | 550 | ... | ... | ... | 900 | ... | ... | ... | 1000 |
| | 550 | ... | ... | ... | 900 | ... | ... | ... | 1050 |
| Fan low rotating speed (rpm) | 350 | ... | ... | ... | 580 | ... | ... | ... | 850 |
| Fan high rotating speed (rpm) | 650 | ... | ... | ... | 1170 | ... | ... | ... | 1300 |

In other words, the control device 30 controls the operation of the electromagnetic proportional control valve 24 during the rotation of the engine 15, on the basis of whether the detection signal from the lever switch 33 indicates the operating state of the working machine lever 18, the temperature detection results of the cooling water and the hydraulic oil from the water temperature sensor 28 and the hydraulic oil temperature sensor 29, and a determination whether the rotating speed of the engine 15 and the rotating speed of the cooling fan 21 are within a resonance range. On the basis of the operation control, the rotating speed of the cooling fan 21 is adjusted on the basis of the map in Table 3, by changing a flow rate of the hydraulic oil from the fan hydraulic pump 23 to the fan hydraulic motor 22.

Figure 3:
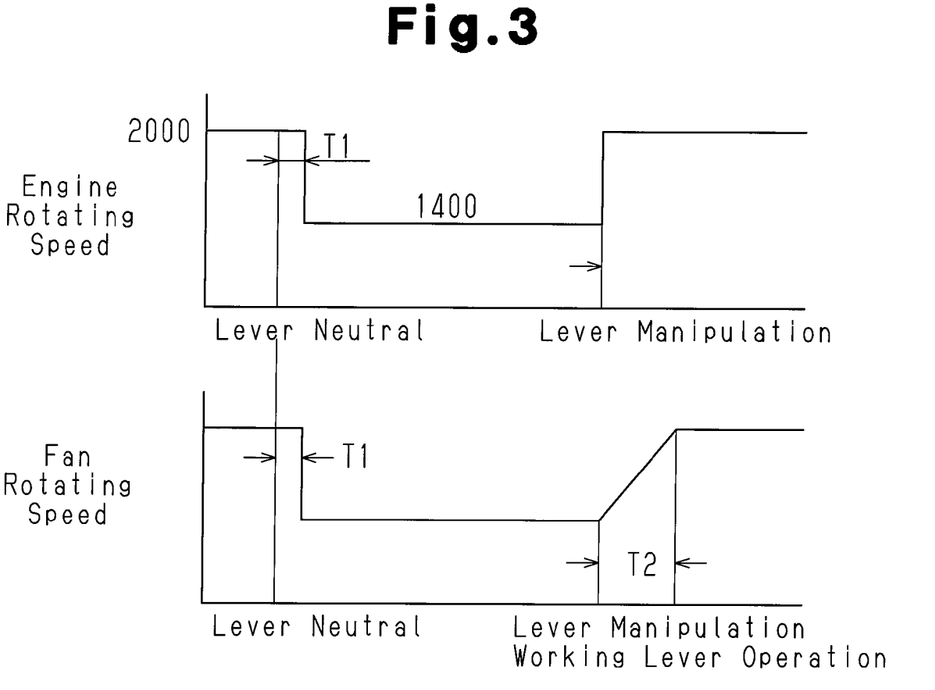
FIG. 3 is a graph showing a relationship between manipulation of a working machine lever and rotating speeds of an engine and a cooling fan in the hydraulic excavator in FIG. 1.

As shown in FIG. 3, at a time when the working machine lever 18 is switched from an operating position to a neutral position and all the working machine levers 18 are arranged at the neutral position, the control device 30 controls the operations of the engine 15 and the hydraulic motor 22 as follows.

In this case, the control device 30 lowers the rotating speed of the engine 15, for example, from a high speed of 2000 rpm corresponding to a normal range to a middle speed of 1400 rpm corresponding to a predetermined low rotating speed range when a predetermined delay time T1 (about 4 seconds) has elapsed after all the working machine levers 18 are arranged at the neutral position, and lowers the rotating speed of the cooling fan 21 when the predetermined time T1 (about 4 seconds) has elapsed after all the working machine levers 18 are arranged at the neutral position. As a result, when, for example, one of the working machine levers 18 is switched from one working position to another while passing through the neutral position, the engine rotating speed is prevented from being fluctuated. That is, a situation is prevented in which the engine rotating speed abruptly goes down as the working machine lever 18 passes through the neutral position and is subsequently returned as the working machine lever 18 reaches the other working position.

Further, in a state in which all the working machine levers 18 are arranged at the neutral position, the engine rotating speed is lowered after the delay time T1, and the fuel is saved on the basis of the reduction of the rotating speed. In this case, a descending amount of the fan rotating speed is controlled in accordance with the map shown in Table 3 in correspondence to the temperature of the hydraulic oil.

Further, after the engine rotating speed is lowered in accordance with the arrangement of all the working machine levers 18 at the neutral position, the control device 30 further controls the operations of the engine 15 and the hydraulic motor 22 when at least one of the working machine levers 18 is switched from the neutral position to the operating position. In other words, the control device 30 immediately increases the rotating speed of the engine 15 from a middle speed of 1400 rpm to a high speed of 2000 rpm and gradually increases the rotating speed of the cooling fan 21 in a predetermined time T2 (2 to 3 seconds), in accordance with the switching of the working machine lever 18 to the operating position. As a result, it is possible to prevent the pressure within the fan hydraulic pump 23 or the pressure of the working fluid supplied from the fan hydraulic pump 23 to the fan hydraulic motor 22 from suddenly rising. Thus, the distribution paths of the hydraulic oil and the various hydraulic devices are prevented from being broken.

Next, a description will be given of an operation of the control device for the hydraulically driven fan structured as mentioned above with reference to a flowchart shown in FIG. 4. Procedures of a flowchart shown in FIG. 4 and flowcharts in FIGS. 5 and 6 mentioned below are carried out in accordance with the programs stored within the memory section 34 on the basis of the control of the control device 30.

Figure 4:
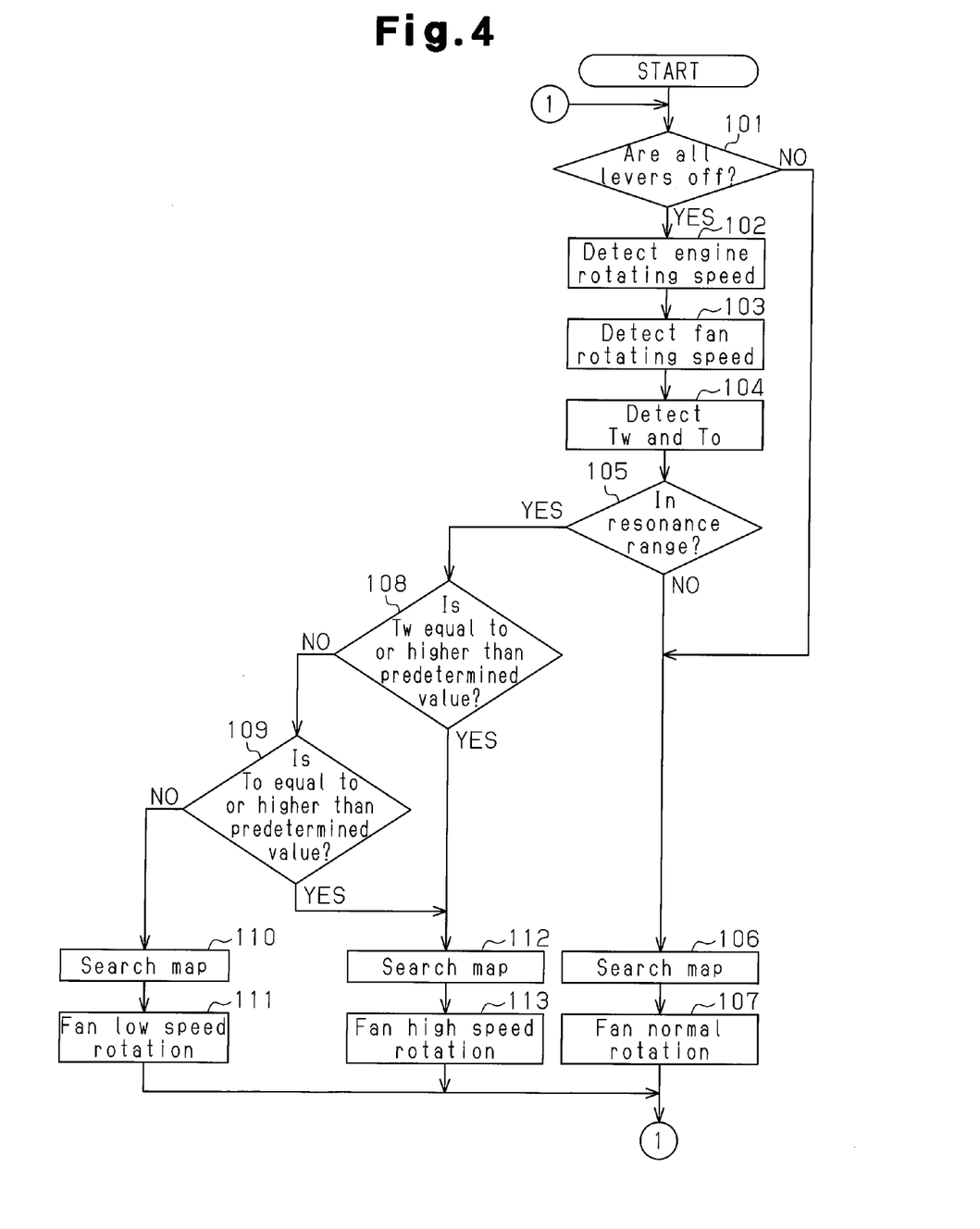
FIG. 4 is a flowchart showing an adjusting operation of the rotating speed of the cooling fan in the hydraulic excavator in accordance with the first embodiment.

In the control device of the hydraulically driven fan, the rotating speed of the cooling fan 21 is adjusted on the basis of the control of the control device 30 when the engine 15 is being rotated. In other words, in step 101, the respective lever switches 33 detect whether all the working machine levers 18 are in a non-operated state. If at least one working machine lever 18 has been operated so as to be arranged at an operating position, the process goes to step 106, and search of the map shown in Table 4 is carried out. Then, one normal rotating speed of the cooling fan 21 is selected in correspondence to the rotating speed of the engine 15. In accordance with the selected speed, a flow rate of the hydraulic oil from the hydraulic pump 23 to the hydraulic motor 22 is adjusted on the basis of an actuation of the electromagnetic proportional control valve 24 in step 107, and the cooling fan 21 is rotated at the selected normal rotating speed.

If it is determined in step 101 that all the working machine levers 18 are arranged at the neutral position and the working device of the hydraulic excavator is in the stopped state, the rotating speed of the engine 15 is detected by the engine rotating speed sensor 31 in step 102. Next, the rotating speed of the cooling fan 21 is detected by the fan rotating speed sensor 32 in step 103. In the next step 104, the cooling water temperatures Tw and the hydraulic oil temperatures To are respectively detected by the water temperature sensor 28 and the hydraulic oil temperature sensor 29.

Thereafter, it is determined in step 105 whether a primary frequency noise of the engine 15 and a primary frequency noise of the cooling fan 21 are in a resonance range on the basis of the results of detection of steps 102 and 103. In other words, in step 105, the primary frequencies of the cooling fan 21 and the engine 15 shown in the Tables 1 and 2 stored in the memory section 34 are determined on the basis of the detected rotating speed of the cooling fan 21 and the detected rotating speed of the engine 15. Further, it is determined whether the difference between the primary frequencies is within a predetermined value.

If it is determined in step 105 that the primary frequency noise does not exist in the resonance range, the process proceeds to step 106. In step 106, the search of the map shown in Table 3 is carried out as mentioned above. Thereafter, the cooling fan 21 is rotated in such a manner as to maintain the selected normal rotating speed in step 107.

On the other hand, if it is determined in step 105 that the primary frequency exists in the resonance range, it is determined in step 108 whether the temperature detection result of the cooling water is equal to or more than a predetermined value (for example, a temperature determined as a water temperature overheat). If the cooling water temperature is equal to or more than the predetermined value, process goes to step 112. Further, in step 112, the map shown in Table 3 is searched, and the cooling fan 21 is rotated at a fan high rotating speed (650 to 1300 rpm in the map shown in Table 3) in correspondence to the engine rotating speed in step 113. On the basis of the fan high speed rotation, the resonance between the primary frequency noise of the engine 15 and the primary frequency noise of the cooling fan 21 is avoided, as is apparent from the map in Table 3 and the mathematical expression 1.

On the other hand, in the determination of step 108 mentioned above, if the temperature detection result of the cooling water is less than the predetermined value, it is determined in step 109 whether the temperature detection result of the hydraulic oil is a predetermined value (a temperature determined as a temperature overheat of the hydraulic oil). Further, if the temperature detection result of the hydraulic oil is equal to or more than the predetermined value, the process proceeds to step 112. In step 112, the search of the map is carried out in the same manner as mentioned above. Thereafter, the cooling fan 21 is rotated at a fun high rotating speed for avoiding the resonance in step 113.

In contrast, in the determination of step 109, if the temperature detection result of the hydraulic oil is less than the predetermined value, the map shown in Table 3 is searched in step 110, and the low rotating speed (350 to 850 rpm in the map shown in Table 3) of the cooling fan 21 in correspondence to the rotating speed of the engine 15 is determined. Then, the cooling fan 21 is rotated at the predetermined fan low rotating speed in correspondence to the rotating speed of the engine 15 in step 119. In the case of the fan low speed rotation, the resonance between the primary frequency noise of the engine 15 and the primary frequency noise of the cooling fan 21 is avoided, as is apparent from the map in Table 3 and the mathematical expression 1.

As is apparent from Tables 1 to 3, if the rotating speed is set to the minimum in the normal rotating speed range of the cooling fan 21 in correspondence to the engine rotating speed, for example, if the normal rotating speed of the cooling fan 21 is 800 rpm in the case that the engine rotating speed is 1400 rpm, the primary frequency noises thereof respectively come to 70 Hz and 80 Hz since the engine is the in-line six-cylinder engine, and the number of the impeller blade of the cooling fan 21 is six. As a result, since the difference therebetween is only 10 Hz, the frequency noises are resonated, and uncomfortable resonance noise and vibration are generated. Accordingly, in order to deflect both primary frequencies widely from the resonance range, control for lowering the fan rotating speed, for example, to 580 rpm, or control for increasing the fan rotating speed to 650 Hz is executed.

As mentioned above, in this embodiment, when all the working machine levers 18 are at the neutral position and the engine 15 and the cooling fan 21 are set in the resonance range, if the temperature of at least one of the cooling water and the hydraulic oil is equal to or more than the predetermined temperature, the fan rotating speed becomes high, and the resonance is avoided. Further, when the temperatures of the cooling water and the hydraulic oil are equal to or less than the predetermined temperature, that is, under a condition that the reduction of the rotating speed of the cooling fan is allowed, the fan rotating speed becomes low, and the resonance is avoided and the fuel consumption is improved.

Therefore, in accordance with this embodiment, the resonance noise and the vibration are prevented without adversely affecting the cooling effect generated by the working fluid. Further, in accordance with this embodiment, since the control of the rotating speed of the cooling fan 21 is carried out in accordance with the maps, it is possible to rapidly carry out the control.

Figure 5:
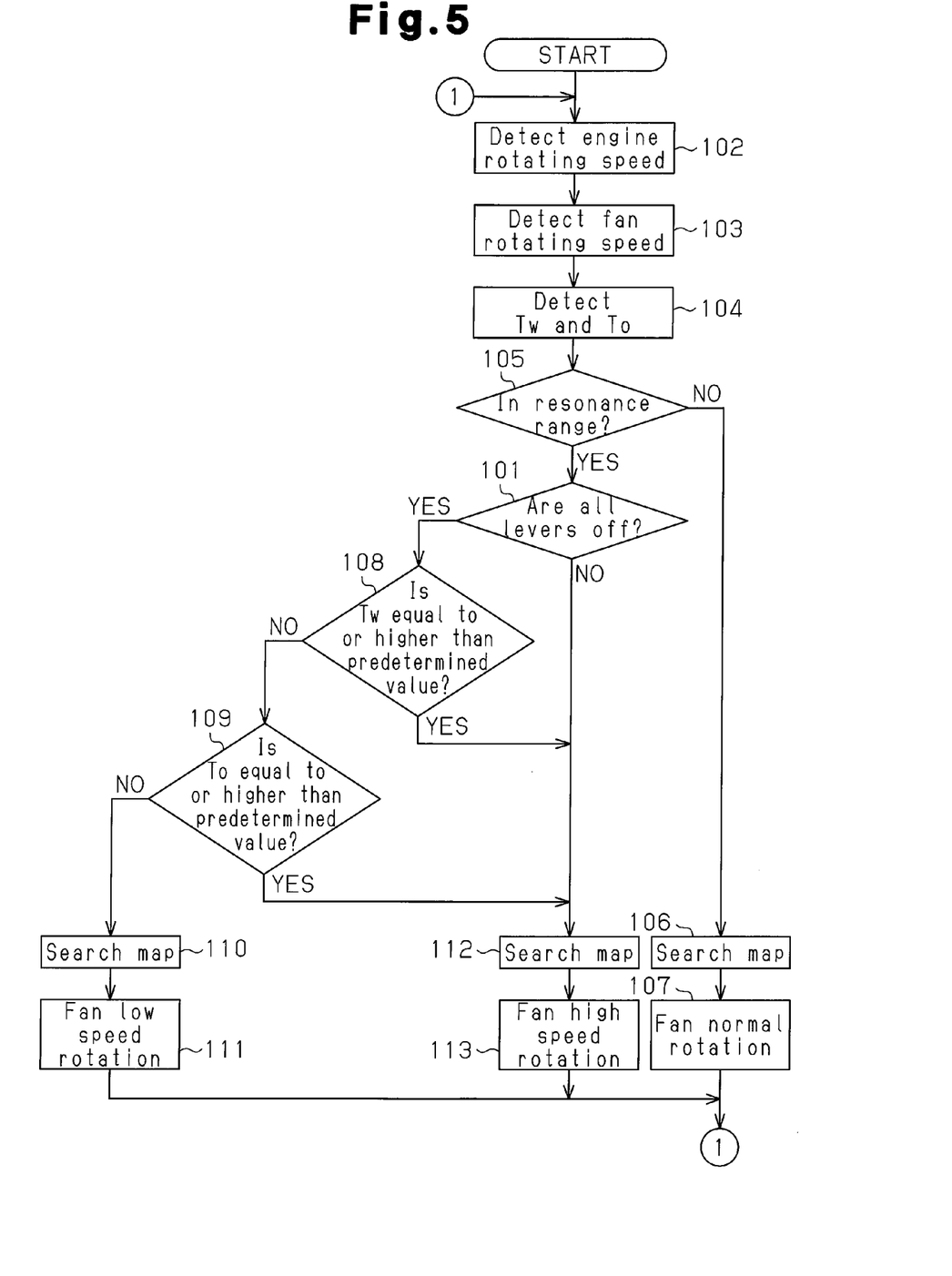
FIG. 5 is a flowchart showing an adjusting operation of a rotating speed of a cooling fan in a hydraulic excavator in accordance with a second embodiment.

Next, a description will be given of a second embodiment in accordance with the present invention by focusing on differences from the first embodiment. In other words, the second embodiment is different from the first embodiment in that the process of step 102 is first executed, and the process of step 101 is executed subsequent to the process of step 105, as shown in FIG. 5.

In other words, in steps 102 to 104, the engine rotating speed, the fan rotating speed, the temperature Tw of the cooling water, and the temperature To of the hydraulic oil are detected respectively.

Next, it is determined in step 105 whether the primary frequency noise of the cooling fan 21 and the primary frequency noise of the engine 15 are in the resonance range. Thereafter, if the primary frequency noises are not in the resonance range, the map shown in Table 3 is searched in step 106, and the cooling fan 21 is rotated at the normal rotating speed in step 107.

If the primary frequency noise of the cooling fan 21 and the primary frequency noise of the engine 15 are in the resonance range, the process goes to step 101, and it is determined whether all the working machine levers 18 are at the neutral position. Further, if any one of the working levers 18 has been operated, the map in Table 3 is searched in step 112, and the high rotating speed of the cooling fan 21 in correspondence to the rotating speed of the engine 15 is determined. The cooling fan 21 is then rotated at the high rotating speed in step 113. Accordingly, the resonance between the primary frequent noise of the engine 15 and the primary frequency noise of the cooling fan 21 is avoided.

In contrast, in the case that none of the working machine levers 18 has been operated, the process goes to step 108, and it is determined whether the detection temperature Tw of the cooling water is equal to or higher than the predetermined value. If the detection temperatures are equal to or higher than the predetermined value, the process goes to steps 112 and 113, and the cooling fan 21 is rotated at the fan high rotating speed after the search of the map is carried out.

Further, if it is determined in step 108 that the detection temperature Tw of the cooling water is not equal to or higher than the predetermined value, the oil detection temperature To is determined in step 109. If the detection temperature To is equal to or higher than the predetermined value, the process goes to steps 112 and 113. If the detection temperature To is lower than the predetermined value, the process goes to step 110 and the map shown in Table 3 is searched. Further, in step 111, the cooling fan 21 is rotated at the low fan rotating speed, and the resonance range is avoided.

Accordingly, the second embodiment has the same advantages as those of the first embodiment.

Next, a description will be given of a third embodiment of the present invention by focusing on differences from the first embodiment.

Figure 6:
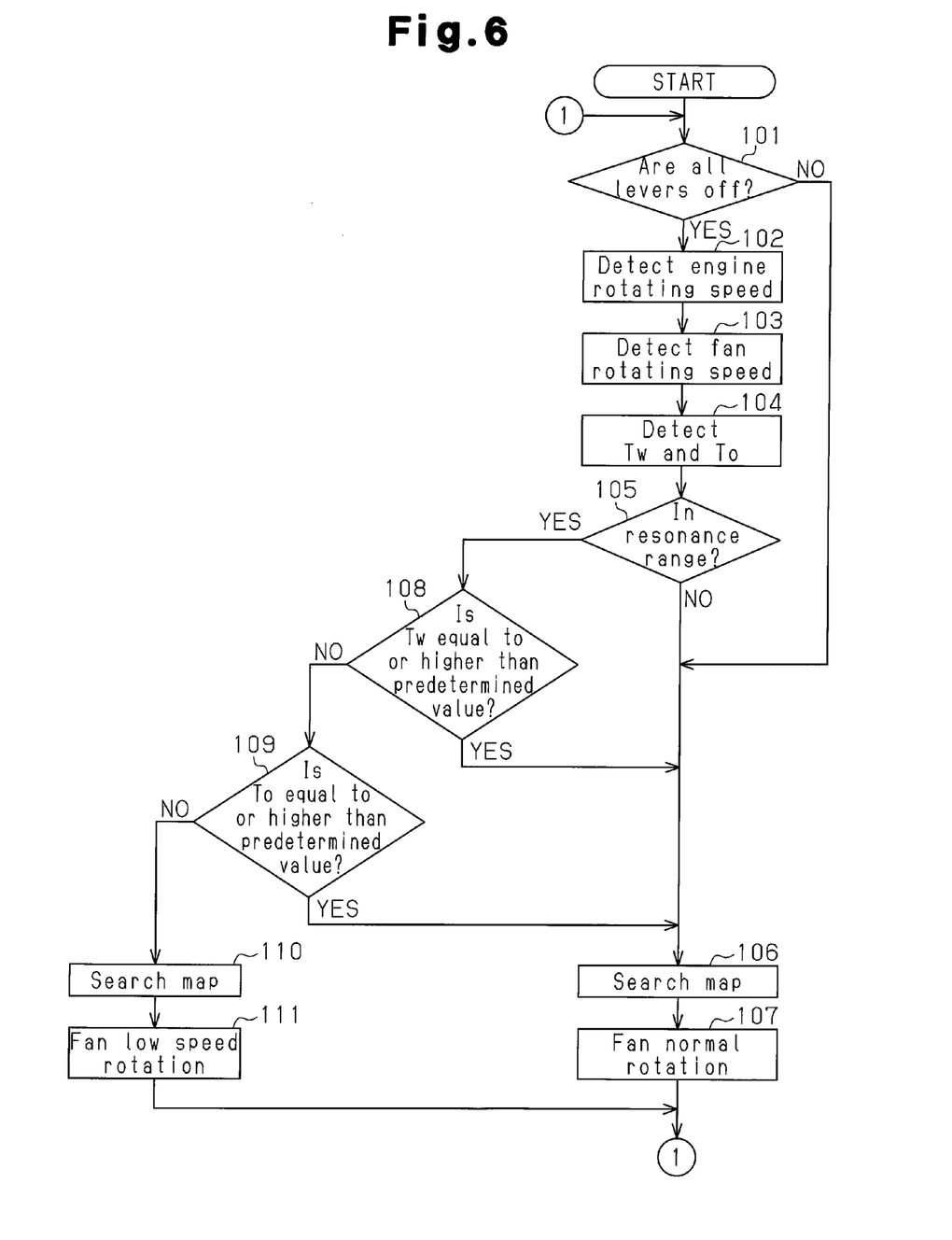
FIG. 6 is a flowchart showing an adjusting operation of a rotating speed of a cooling fan in a hydraulic excavator in accordance with a third embodiment.

In the third embodiment, step 112 and step 113 in the second embodiment are omitted as shown in a flowchart of FIG. 6. Further, if it is determined in step 108 and step 107 that the cooling water temperatures Tw and the hydraulic oil temperatures To are equal to or higher than the predetermined value, the process goes to step 106 and the map shown in Table 3 is searched. The normal rotating speed is then selected in step 107. In step 108 and step 107, it is rarely determined that the temperatures Tw and To are equal to or higher than the predetermined value since the water temperature is, for example, in an overheat state. Accordingly, the rotating speed of the cooling fan 21 is rarely maintained when the cooling fan 21 is within the resonance range.

Next, a description will be given of a fourth embodiment in accordance with the present invention by focusing on differences from the second embodiment.

In the fourth embodiment, the low speed rotation and the high speed rotation of the cooling fan 21 for avoiding the resonance are executed on the basis of a computation without being based on maps. As shown in a flowchart in FIG. 7, a computing operation shown in a mathematical expression is executed in step 116 and step 115, in place of the map searching operation of steps 112 and 110 in the flowchart in accordance with the second embodiment.

Figure 7:
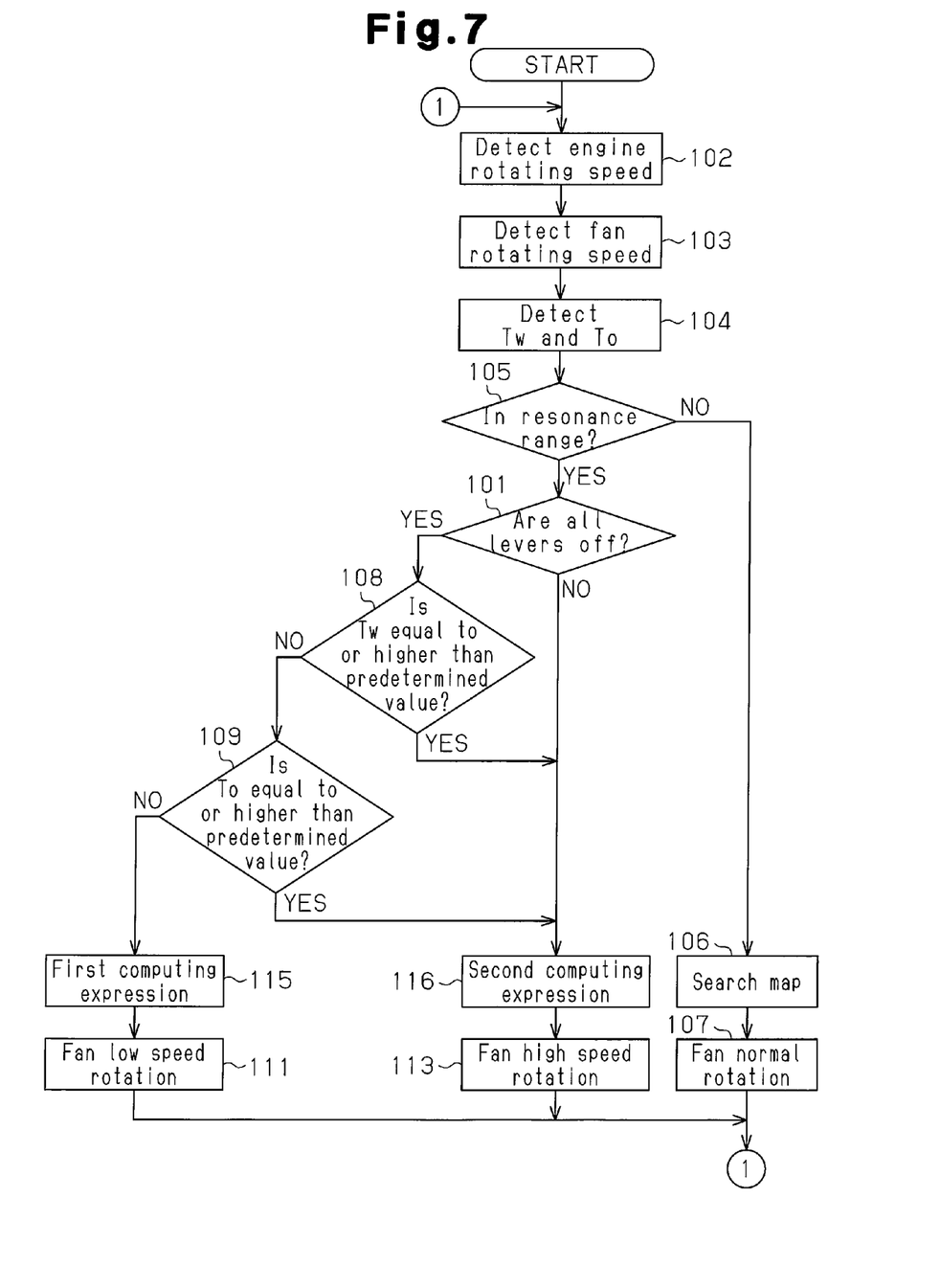
FIG. 7 is a flowchart showing an adjusting operation of a rotating speed of a cooling fan in a hydraulic excavator in accordance with a fourth embodiment.

Expression 2

$$Nfa=(Ne \times (C/2)+60 \cdot \Delta fo)/F \qquad (1)$$

$$Nfa=(Ne \times (C/2)-60 \cdot \Delta fo)/F \qquad (2)$$

Δf: frequency difference between engine and fan (Hz)
Ne: engine rotating speed (rpm)
C: number of engine cylinders
F: number of fan impeller blades
Δfo: resonance range (Hz)
Nfa: fan rotating speed final command value (rpm)

In other words, in step 115, a fan high rotating speed (a final command value: Nfa) of the cooling fan 21 is determined on the basis of an expression (1) shown in the mathematical expression 2, and the cooling fan 21 is rotated at the high rotating speed in the next step 111.

Further, in step 116, the fan low rotating speed (a final command value: Nfa) of the cooling fan 21 is determined on the basis of an expression (2) shown in the mathematical expression 2, and the cooling fan 21 is rotated at this low rotating speed in the next step 113.

Accordingly, in the fourth embodiment, it is not necessary to prepare the maps related to the low and high rotating speeds of the cooling fan 21 for different machine types. Therefore, the load of the memory section is reduced. Also, even if the specification and type of the hydraulic excavator are changed, it is not necessary to prepare maps that correspond to the changed specification and type. The fourth embodiment is therefore has an excellent versatility.

The present invention is not limited to the embodiments mentioned above. For example, the present invention may be carried out in the following manner. First, it is determined whether all the levers are at the neutral position as in the first embodiment. Then, in the routine for detecting temperature Tw of the cooling water and the temperature To of the hydraulic oil and determining whether the temperatures Tw and To are in the resonance range, the fan high rotating speed and the fan low rotating speed for avoiding the resonance are achieved by the computation as in the fourth embodiment.

Further, the adjusting control of the rotating speed of the cooling fan 21 in each of the embodiments may be carried out by the control device of a hydraulically driven fan mounted on a construction machine other than the hydraulic excavator, for example, a bulldozer.

Further, the structure may be made such that the fan rotating speed is controlled by detecting either the cooling water temperature or the hydraulic oil temperature, and in correspondence to the detection result, whereby the resonance is avoided.

The invention claimed is:

1. A control device for a hydraulically driven fan, comprising:
    a cooling fan rotated by a hydraulic motor and carrying out a ventilation for cooling a working fluid that is involved in an operation of an engine;
    first detecting means for detecting a temperature of the working fluid;
    adjusting means for adjusting a rotating speed of the hydraulic motor in correspondence to a result of detection of the first detecting means;
    second detecting means for detecting whether a working mechanism actuated by the engine is in a stopped state by determining whether a working machine lever has been operated; and
    control means for controlling an operation of the adjusting means in correspondence to a result of detection by the second detecting means thereby adjusting the rotating speed of the hydraulic motor in such a manner that a resonance between the cooling fan and the engine is suppressed, wherein if the working machine lever has not been operated and a temperature of the working fluid is lower than a predetermined value, the control means causes the adjusting means to operate in such a manner that a rotating speed of the cooling fan is lowered;
    wherein, when all the working machine levers are switched to a neutral position from an operating position, the control means controls the operations of the engine and the hydraulic motor in such a manner that the rotating speeds of the engine and the cooling fan are lowered from a normal range to a predetermined low rotating speed range after a predetermined delay time has elapsed.

2. A control device for a hydraulically driven fan, comprising:
    a cooling fan rotated by a hydraulic motor and carrying out a ventilation for cooling a working fluid that is involved in an operation of an engine;
    first detecting means for detecting a temperature of the working fluid;
    adjusting means for adjusting a rotating speed of the hydraulic motor in correspondence to a result of detection of the first detecting means;
    second detecting means for detecting whether a working mechanism actuated by the engine is in a stopped state by determining whether a working machine lever has been operated; and
    control means for controlling an operation of the adjusting means in correspondence to a result of detection by the second detecting means thereby adjusting the rotating speed of the hydraulic motor in such a manner that a resonance between the cooling fan and the engine is suppressed, wherein if the working machine lever has not been operated and a temperature of the working fluid is lower than a predetermined value, the control means causes the adjusting means to operate in such a manner that a rotating speed of the cooling fan is lowered;
    wherein, when at least one of the working machine levers is switched to an operating position from a state in which all the working machine levers are at a neutral position, the control means controls the operations of the engine and the hydraulic motor in such a manner that the rotating speed of the engine is immediately increased from a low rotating speed range to a normal range, and that the rotating speed of the cooling fan is gradually increased in a predetermined time.

* * * * *